United States Patent
Einarsson et al.

(10) Patent No.: US 10,116,971 B2
(45) Date of Patent: *Oct. 30, 2018

(54) METHOD AND SYSTEM FOR FETCHING A PORTION OF A LIVE MEDIA STREAM BEFORE A FIRST AD FINISHES PLAYING TO DETECT THE SUBSEQUENT AD INDICATOR FOR LIVE CONSECUTIVE AD REPLACEMENT

(71) Applicant: MobiTV, Inc., Emeryville, CA (US)

(72) Inventors: Torbjörn Einarsson, Stockholm (SE); Kenth Andersson, Bromma (SE)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,254

(22) Filed: Oct. 28, 2016

(65) Prior Publication Data
US 2017/0048565 A1 Feb. 16, 2017

Related U.S. Application Data

(63) Continuation of application No. 14/730,211, filed on Jun. 3, 2015, now Pat. No. 9,510,025.

(51) Int. Cl.
*H04N 21/234* (2011.01)
*H04N 21/44* (2011.01)
(Continued)

(52) U.S. Cl.
CPC ... *H04N 21/23424* (2013.01); *G06Q 30/0241* (2013.01); *H04N 21/2187* (2013.01);
(Continued)

(58) Field of Classification Search
None
See application file for complete search history.

(56) References Cited

U.S. PATENT DOCUMENTS

| 7,203,758 B2 * | 4/2007 | Cook | H04N 7/165 348/E7.063 |
|---|---|---|---|
| 8,732,745 B2 | 5/2014 | McCoy et al. | |

(Continued)

OTHER PUBLICATIONS

"U.S. Appl. No. 14/730,211, Ex Parte Quayle Action mailed Jun. 3, 2016", 7 pages.

(Continued)

*Primary Examiner* — Hoang Vu A Nguyen Ba
(74) *Attorney, Agent, or Firm* — Kwan & Olynick LLP

(57) ABSTRACT

Techniques and mechanisms described herein facilitate consecutive live ad insertion for live media streams. A live media stream is received and played at a client device. A first ad indicator in the live media stream, indicating a first start point for a first ad period, is detected. Upon reaching the first start point, reception of the live media stream is paused and one or more first replacement ads are played instead of one or more first original ads. Before the first ad period ends, a small portion of the live media stream is fetched in order to detect the presence of a second ad indicator indicating the presence of a second, consecutive ad period in the live media stream. Upon detecting the second ad indicator, one or more second replacement ads are played during the second ad period.

20 Claims, 9 Drawing Sheets

(51) Int. Cl.

| | |
|---|---|
| *G06Q 30/02* | (2012.01) |
| *H04N 21/2668* | (2011.01) |
| *H04N 21/458* | (2011.01) |
| *H04N 21/262* | (2011.01) |
| *H04N 21/845* | (2011.01) |
| *H04N 21/2187* | (2011.01) |
| *H04N 21/81* | (2011.01) |

(52) U.S. Cl.
CPC ... *H04N 21/2668* (2013.01); *H04N 21/26241* (2013.01); *H04N 21/44008* (2013.01); *H04N 21/44016* (2013.01); *H04N 21/458* (2013.01); *H04N 21/812* (2013.01); *H04N 21/8456* (2013.01)

(56) References Cited

U.S. PATENT DOCUMENTS

| | | |
|---|---|---|
| 8,752,085 B1 | 6/2014 | Brueck et al. |
| 2002/0083439 A1 | 6/2002 | Eldering |
| 2004/0158858 A1* | 8/2004 | Paxton ............... H04N 7/17336 725/42 |
| 2005/0097361 A1* | 5/2005 | Apostolopoulos ...... G06F 21/64 726/4 |
| 2005/0114883 A1* | 5/2005 | Nagai ..................... G07F 19/20 725/34 |
| 2006/0075449 A1* | 4/2006 | Jagadeesan ............ G06Q 30/02 725/113 |
| 2006/0287912 A1 | 12/2006 | Raghuvamshi |
| 2008/0195457 A1* | 8/2008 | Sherman ............ G06Q 30/0267 455/414.3 |
| 2010/0146542 A1* | 6/2010 | Weihs ................ H04N 7/17318 725/34 |
| 2010/0325657 A1 | 12/2010 | Sellers et al. |
| 2011/0246661 A1* | 10/2011 | Manzari ................. G06Q 30/02 709/231 |
| 2011/0271299 A1 | 11/2011 | Kakani, Sr. et al. |
| 2012/0137015 A1* | 5/2012 | Sun .................. H04N 21/26258 709/231 |
| 2012/0166289 A1* | 6/2012 | Gadoury ............ G06Q 30/0269 705/14.66 |
| 2012/0246672 A1 | 9/2012 | Sridhar et al. |
| 2013/0007799 A1 | 1/2013 | Sandoval |
| 2014/0047472 A1 | 2/2014 | Haberman et al. |
| 2014/0068657 A1 | 3/2014 | Leminh |
| 2014/0114760 A1 | 4/2014 | Reinshagen |
| 2014/0245346 A1 | 8/2014 | Cheng et al. |
| 2014/0344852 A1 | 11/2014 | Reisner et al. |
| 2015/0326945 A1 | 11/2015 | Johnson et al. |

OTHER PUBLICATIONS

"U.S. Appl. No. 14/730,211, Notice of Allowance dated Jul. 29, 2016", 6 pages.

* cited by examiner

METHOD AND SYSTEM FOR FETCHING A PORTION OF A LIVE MEDIA STREAM BEFORE A FIRST AD FINISHES PLAYING TO DETECT THE SUBSEQUENT AD INDICATOR FOR LIVE CONSECUTIVE AD REPLACEMENT

CROSS-REFERENCE TO RELATED APPLICATIONS

This application is a continuation of and claims priority to U.S. patent application Ser. No. 14/730,211, filed on Jun. 3, 2015, by Tobjorn Einarsson, which is hereby incorporated by reference in its entirety and for all purposes.

TECHNICAL FIELD

The present disclosure relates to the provision of streaming media content.

BACKGROUND

A media content system may make a number of media content streams available for viewing upon request by users. These media content streams often contain advertisements, or ads. Often, streaming services, such as YouTube, have pre-roll, mid-roll, or post-roll ads. Pre-roll ads are displayed to a user before the requested media content is played. Mid-roll ads occur as breaks in the viewing of the requested media content, similar to commercial breaks for television shows. Post-roll ads are displayed to a user after the requested media content has played. With media delivery over the Internet, personal ads have become possible. In other words, it is possible to replace or insert replacement ads, more personally directed towards the viewer, in place of original ads contained in the media content streams.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
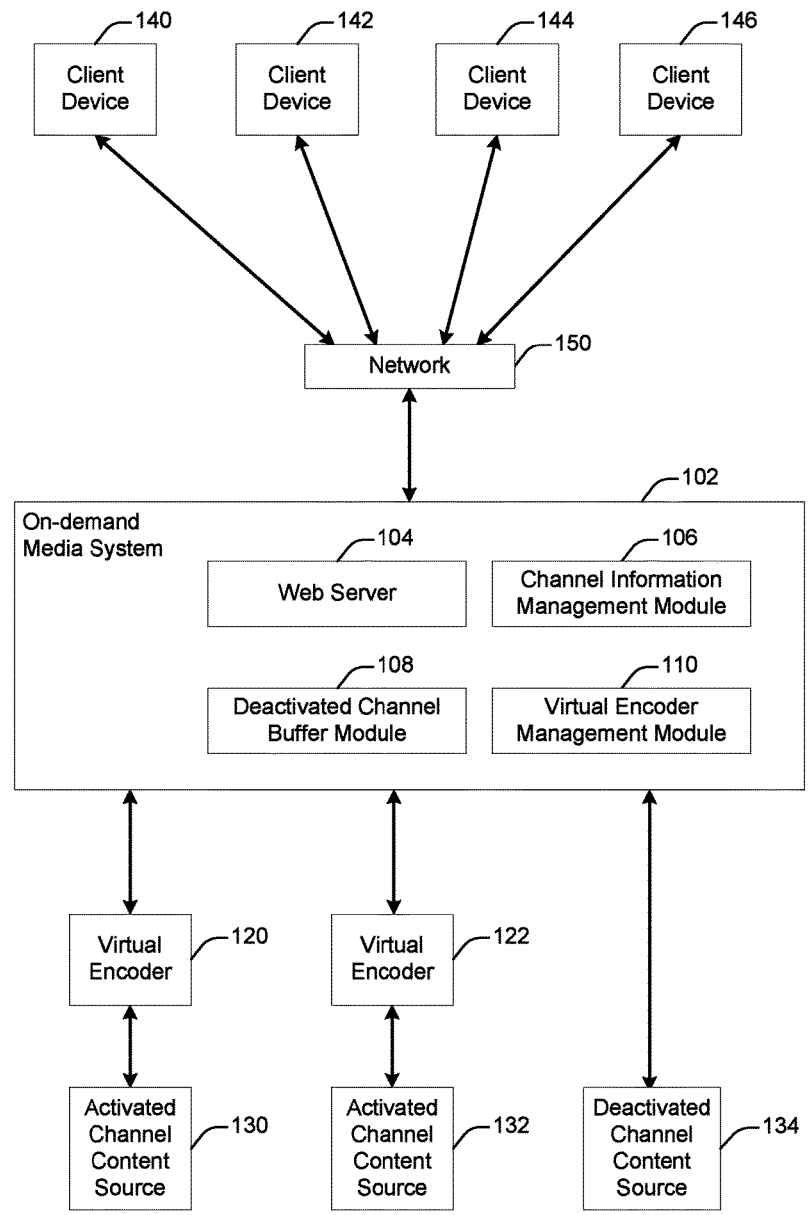
FIG. 1 illustrates an example of a system, configured in accordance with various techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular content streams, servers, and encoding mechanisms. However, it should be noted that the techniques of the present invention apply to a wide variety of different content streams, servers, and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein facilitate consecutive live ad insertion for live media streams. A live media stream is received and played at a client device. A first ad indicator in the live media stream, indicating a first start point for a first ad period, is detected. Upon reaching the first start point, reception of the live media stream is paused and one or more first replacement ads are played instead of one or more first original ads. Before the first ad period ends, a small portion of the live media stream is fetched in order to detect the presence of a second ad indicator indicating the presence of a second, consecutive ad period in the live media stream. Upon detecting the second ad indicator, one or more second replacement ads are played during the second ad period. In some embodiments, what is signaled is an ad period defined by splice points rather than a specific ad. During the ad period, the original content of the live media stream can be replaced by one or multiple ads. The techniques and mechanisms of the present disclosure focus on handling consecutive ad periods in an efficient manner.

Example Embodiments

According to various embodiments, users of client devices may receive content from a content management service. The content management service may facilitate the interaction of users with various types of content. For instance, the content management service may provide a user interface for managing and accessing content from a number of different content sources. The interface may display content received via a cable or satellite television connection, one or more on-demand-video service providers such as Netflix or Amazon, and/or content accessible on local or network storage locations. In addition, the interface may be used to access this content on any number of content playback devices, such as televisions, laptop computers, tablet computers, personal computers, and mobile phones. At least some of the content may include live audio and/or video streams.

With today's technology, live media content streams over TV or the Internet allow for the possibilities of personal ads to be displayed to viewers. In traditional TV distributions, with ad breaks at rather regular intervals (a.k.a. "commercial breaks"), ads can be replaced at the server side, depending on the transmission region of the distribution. Special cues in the stream mark the start and end point of such ads. One standard for such cues is SCTE-35. When an encoder, or other network node, finds such cues it can choose to splice in another video source, e.g. another ad, so that the output differs from the input. In some embodiments, this can be done seamlessly such that the viewer or user of the client device does not notice the transition to the spliced video source. In some embodiments, this is referred as a SCTE-35 splice insert event. The network node system still receives and monitors the same or original input stream in order to detect later cues, including cues signaling a consecutive ad period following the ad period that is currently valid or playing.

With Internet streaming, there is an ongoing transition towards client-side ad-insertion, which allows for insertion of personal ads at the client device. Personal ads can be chosen based on a variety of factors, such as user preferences, browsing history, user profiles, geographical locations, or time of day. One standard for HTTP streaming is DASH. DASH-IF provides guidelines on how to implement client-side ad insertion. In these guidelines, there are two approaches: manifest-driven, and application-driven. The techniques and mechanisms described herein utilize the application-driven approach.

In the application-driven approach, the SCTE-35 cues mentioned previously are transformed and sent to the client as emsg boxes in media segments. When a client receives such a box, it becomes informed that there is an upcoming replaceable ad period. In addition, the emsg boxes also inform the client of the duration of the upcoming ad period. An application, or app, can then contact an ad server and receive a link to an appropriate personal ad, or a series of ads, that can be played during the signaled ad period duration.

In some embodiments, the system stops or pauses fetching the live stream and only resumes fetching as the ad period ends or after the ad period is over. This has the benefit of saving network resources and also allows for faster download of the replacement ads over the network link, since the competing default ad is not being downloaded. However, in some cases, there may be a directly succeeding ad period, or a consecutive ad period, following the first ad period. In such embodiments, this consecutive ad period is also signaled by an SCTE-35 emsg box in the media segments. In some embodiments, since the client does not fetch the stream during the ad, it will also not receive the SCTE-35 emsg box cue signaling a consecutive ad period. As described with reference to traditional TV distributions, this problem is not an issue as long as the device always listens to the stream, as the case with network nodes. In some embodiments, a simple, but non-efficient, solution for client-side ad insertion systems is to let the live stream continue to be fetched and processed, but not displayed, while the replacement ads are running. However, in such embodiments, constant live stream fetching and processing can be wasteful, since the original ads in the live media stream are not displayed to the user but the fetching and processing of the non-displayed media content still require bandwidth and resources.

Thus, in various embodiments, the client device fetches a small part of the live media stream, called media segments, during the playback of the ad period using HTTP range requests. For example, the client device may fetch the first 1 kB of the live video segments during the last 10 s of the ad. In some embodiments, fetching a small portion of the live media stream is sufficient for determining the presence of a consecutive ad indicator because emsg boxes must be one of the first boxes in the segments. In some embodiments, the emsg box comes right after a small box in the live media stream called an STYP box. By analyzing the fetched data, it is therefore possible to see if there is an emsg box and extract the information about a possible upcoming ad break in the live media stream. In some embodiments, if an emsg box was detected in the fetched data but only a portion of the emsg box was present in the fetched data, the system will be prompted to fetch more data subsequent to the already fetched data in order to receive and analyze the rest of the emsg box.

In some embodiments, if a subsequent SCTE-35 emsg box is detected, a determination can be made as to whether the subsequent upcoming ad period is directly consecutive to the current ad period playing. As used herein, a subsequent ad period that is "directly consecutive" to a first ad period means that the subsequent ad period begins immediately following the first ad period without other content from the live stream being played in between. In some embodiments, by comparing the timestamp in the subsequent SCTE-35 emsg box with the timestamp and duration information contained in the first SCTE-35 emsg box, it is possible to see if the ad periods are directly consecutive. In such embodiments, the app can ask for another personal ad or series of ads to be played, or inserted, during the subsequent ad period instead of an original ad or series of ads. In some embodiments, the cycle of fetching small portions of the live media stream and playing replacement ads after an ad indicator is detected is repeated until ad indicators are no longer detected in the fetched portions of the live stream media. If no ad indicator (SCTE-35 emsg box) is detected, then the system resumes fetching of the entire live media stream.

In various embodiments, if a consecutive ad period is detected, then the system plays another replacement ad or series of ads instead of the original ad content in the live media stream, and delays resuming fetching of the live media stream. If a consecutive ad period is not detected, then the system will resume fetching the live media stream as the first ad period ends. If a subsequent ad indicator is detected in the sample, but the system has determined that the ad period is not consecutive, then the system will resume fetching the live media stream after the first ad period ends and play another replacement ad or series of ads upon reaching the start point designated by the subsequent ad indicator.

In some embodiments, a live media stream is divided into chunks called "segments." As used herein, fetching "only a portion" refers to fetching no more than a small sample of the segments. In some embodiments, fetching "a portion" of the live media stream refers to a portion of a single segment in the live media stream. In other embodiments, fetching "a portion" refers to retrieving a whole segment or a series of segments. As used herein, fetching "only a portion" will not be interpreted to encompass fetching the full, or entire, live media segments. In some embodiments, no part of the audio-visual media itself is needed for detecting the signaling. In such embodiments, even for encrypted content, where the Common Encryption Format is used, there are no issues since the signaling is sent in the clear, in contrast to the audio-visual data. As used herein, the terms "resuming reception" or "resuming fetching of the entire live media stream" are used to mean resuming reception of the live media stream with the intention of receiving and playing the full rest of the live media stream or complete media segments (at least until another pause or break).

In some embodiments, a "sample," a "little bit," and a "portion" of the live media stream are used interchangeably. In some embodiments, a sample can be as little as 50 bytes or as large as a few kilobytes, e.g. 10 kilobytes. In some embodiments, the client device can sample small segments, or small portions of segments, of the live media stream at certain intervals during the first ad period in order to check whether a consecutive ad period is scheduled to play after the first ad period. In some embodiments, decryption of the data is not needed, even if the audio-visual data is encrypted.

In some embodiments, the system uses HTTP Live Streaming (HLS) protocol. For such embodiments using HLS, the same mechanism can be used as described above, although with a few modifications. In such embodiments, a system will typically use ID3 tags instead of emsg boxes. Unlike emsg boxes, ID3 tags can potentially be put early in the live media segments. Thus, the client device will need to also make byte range requests to fetch the beginning of the data in the live media segments. In some embodiments, the segment creator can choose to put the ID3 tags in the beginning of the media segments that follow the first ad starting point. In some embodiments, the segment creator can put the segments at the middle or end. Thus, a system can utilize sampling at regular intervals in order to detect a subsequent ad indicator after a first replacement ad or series of ads has started playing. In some embodiments using HLS, segments are typically encrypted. In such embodiments, it is hard for the application in a system to extract the data. However, in some embodiments, if the optional Sample-AES encryption mode is used, only the audio-visual data, or portions of the audio-visual data, is encrypted. Thus, in such embodiments, the ID3 tags are not encrypted and the extraction of the same can work in a similar manner as described above with regards to DASH protocol and emsg boxes. In some embodiments, data in the live media stream is fully encrypted. In such embodiments, special client-side agents, e.g. MobiDRM agent, can be used to make extraction of data from encrypted segments possible.

In various embodiments, the system can handle consecutive SCTE-35 splice periods without listening to, or receiving, the full media stream. In some embodiments, the cost for just fetching the first 1 kB, or sampled kBs, of the segments is just a few kbps. In some embodiments, the techniques and mechanisms using instream events as described above also work for recorded or time-shifted content. Such embodiments provide an advantage when compared to systems using an out-of-band mechanism, e.g. a file at the side of the stream.

In various embodiments, the live media stream includes both encrypted and unencrypted data. In some embodiments, the beginning portions of segments in Common Encryption Format and SampleAES are unencrypted but the rest of the audio-visual data is encrypted. Even in such embodiments, the ad indicators can be unencrypted. Thus, in such embodiments, ad events can be interpreted without knowing the decryption key because the fetched portion of the live media stream consists of unencrypted data even though the audio-visual data is encrypted. Such embodiments provide an advantage because, in some implementations, retrieval of encryption/decryption keys is limited only to trusted DRM agents.

In various embodiments, the live media stream contains one or more current ad indicators that occur within the first original ad period. In such embodiments, the one or more current ad indicators indicate that segments in the live media stream are currently within the first original ad period. The function for such implementations is to inform a new client tuning in to the live media stream that the live media stream is currently in an ad period. In such embodiments, upon detecting an ad indicator indicating that the live media stream is currently in an ad period, the client-side app makes a determination as to whether there is enough time to pre-fetch, prep, and play one or more replacement ads before the end of the current ad period. If a determination is made that there is time, then the app will proceed with pre-fetching, prepping, and playing one or more replacement ads according to the techniques and mechanisms described herein.

According to various embodiments, media content systems may include a number of media content encoders to encode live media content streams. At least some of these media content encoders may be implemented at least in part in software. For instance, virtual machines may be used to allow software encoders to be enabled and disabled upon request. In some systems, cloud technologies may allow dynamic configuration of encoding resources and variable costs based on actual resources used. For instance, the cost of encoding content may be reduced if an encoder encoding a live media content stream is disabled when no viewer is viewing the live media content stream.

According to various embodiments, the techniques and mechanisms described herein may apply to various live content streaming configurations. For example, the techniques may apply to Hypertext Transfer Protocol (HTTP) streaming using HTTP Live Streaming (HLS), Dynamic Adaptive Streaming over HTTP (DASH), Smooth Streaming, and/or other such technologies. As another example, the techniques may apply to content streamed in accordance with Real-time Transport Protocol (RTP), Real Time Streaming Protocol (RTSP), and/or Transport Stream (TS) technologies. The input stream to the live encoder may be configured in accordance with Moving Picture Experts Group (MPEG)-2 TS or any other suitable streaming input formats.

FIG. 1 illustrates an example of a system, configured in accordance with various techniques and mechanisms of the present invention. The system shown in FIG. 1 is configured for streaming of a number of live streaming media content channels to a plurality of client devices. The system includes an on-demand media system 102 in communication with the virtual encoders 120-122 and configured to receive media content input data from the channel content sources 130-134. The media system 102 is configured to transmit live streaming media data to the client devices 140-146 via the network 150.

In particular embodiments, the media system 102 may be configured to provide a variety of on-demand media content. This content may include, but is not limited to live streaming media content channels such as television channels. For instance, the media system 102 may be configured to provide access to potentially hundreds of television channels. A live streaming media content channel may include any source of video and/or audio content that is available on a live streaming basis. That is, the content presented on the live streaming media content channel varies over time and is live rather than selectable.

According to various embodiments, a client device may view media content by transmitting a request for a media content item to the on-demand media system 102 via the network 150. For instance, a user at the client device may select a channel for viewing in a media content guide. The request may be received at the web server 104. The web server may transmit a response to the client device that includes information such as how to access the requested channel. For instance, the web server may transmit a network address for accessing the requested media content, a description of the media content to be received via the channel, and/or any other relevant information.

In particular embodiments, the web server 104 may transmit and/or receive one or more messages to other modules within the on-demand media system 102. For instance, the web server 104 may communicate with the channel information management module 106 to identify the requested channel and/or receive channel description information for the requested channel.

According to various embodiments, each live streaming media content channel may be received as input data by the on-demand media system 102. For instance, the data may be received from a content source such as a satellite teleport, or over an IP network using UDP multicast. The media may have one or more video streams, one or more audio streams, and/or one or more subtitle streams, any or all of which may be encapsulated in one or more MPEG-2 transport stream. The origin video may be encoded at high quality using a video coding standard such as HEVC/H.265, AVC/H-264 or MPEG-2. Using multicast, the same source can be distributed to multiple encoders that can produce variants of different quality and bitrate. Each encoder can make one or more variants. Another possible configuration is one in which source data is made available to multiple encoders using individual connections from the encoders towards a common server, such as an HTTP server, which provides the TS stream as a continuous or segmented stream.

According to various embodiments, data received from a channel content source may be encoded for transmission to client devices. For instance, data from the activated channel content source 130 is encoded by the virtual encoder 120, while data from the activate channel content source 132 is encoded by the virtual encoder 122. Each virtual encoder may be implemented as a non-static resource on a virtual machine. Each virtual encoder may be configured to be activated and deactivated upon request. A single virtual machine may operate one or more virtual encoders.

In particular embodiments, source data from a single live streaming content source may be encoded in any of various ways. For instance, the source data may be encoded at different bit rates or in different encoding formats. This encoding may be performed by the same virtual encoder or by different virtual encoders.

The configuration and management of virtual encoders and the encoding of source data may be managed by the virtual encoder management module 110. In some implementations, the virtual encoder management module 110 may be responsible for such operations as initiating virtual encoders, activating live streaming content source channels, deactivating live streaming content source channels, and deactivating virtual encoders.

Although FIG. 1 shows each activated channel content source being received directly by a virtual encoder, in various embodiments media may be received in any of various ways. For example, multicast channel source data may be received by the virtual encoding module 110 and then provided to the appropriate virtual encoder. For instance, the virtual encoding module 110 may provide the same source data to different virtual encoders for encoding in different format. Alternately, a master encoder may encode the same source data into different formats.

At any given time, many of the live streaming media channels available via the media system 102 may be viewed by any number of client devices. However, in some instances a media channel that is available for viewing via the media system 102 may not be actually transmitted to any client device. For instance, the channel may be one that has not recently been requested for viewing by any client device. In such instances, the channel may be deactivated. A deactivated channel may be one for which source input data is available but for which the source input data is not encoded for transmission to client devices.

The deactivated channel content source 134 represents a source of live streaming media input data that is not being actively encoded for transmission to one or more client devices. Live streaming media input data received from the deactivated channel content source 134 may be stored in the deactivated channel buffer module 108 to facilitate rapid activation of the deactivated live streaming media channel. The data may be stored in a storage medium configured for rapid access, such as RAM, FLASH, or on a disk drive. The deactivated channel buffer module 108 may store any appropriate amount of live streaming content channel input data.

In particular embodiments, the buffer may store a minimum amount of data necessary in a particular configuration for rapid activation of a previously deactivated channel. Such an amount of data may be, for example, several seconds. However, the minimum amount of necessary data may depend on various factors such as GoP length in the source stream, desired output segment or fragment length, encoding speed, and network latency.

In particular embodiments, the buffer may store an amount of data that exceeds the minimum, such as 30 seconds, several minutes, 30 minutes, or some other amount. Storing a greater amount of data may provide one or more advantages such as facilitating time shifting. When time shifting is supported, a user requesting to view a deactivated live streaming media content channel may not only view the channel quickly due to the rapid channel activation techniques discussed herein, but may also view the channel for some time into the past. For instance, a user who starts viewing the channel a few minutes after the beginning of a program may "rewind" to view the beginning of the program, although that part of the program was not previously encoded.

In particular embodiments, the activation of a live streaming media content channel may involve one or more single encoders. For example, each live streaming media content channel may be assigned to a single virtual encoder for encoding. As another example, a single live streaming media content channel may be assigned to two or more virtual encoders for encoding. For instance, the deactivated channel buffer module 108 may store an amount of data for a live streaming media content channel that would require some non-trivial period of time for a single virtual encoder to encode. In this case, the buffered data may be split among more than one virtual encoder to speed the activation process. Then, after the buffered data is encoded and the live streaming media content channel is activated, any virtual encoder not needed for continuing to encode new live streaming media content channel source data may be shut down.

In some configurations, one possible advantage of enabling multiple encoders is to be able to encode faster. For example, one of the encoders may encode one 2 second splice of a video sequence, while another encodes a second splice. In this way, the encoder farm succeeds in making two segments available in the same time as only one would normally be made.

According to various embodiments, a client device receiving streaming media content data from the on-demand media system 102 may receive the data as a collection of segments or fragments. In order to determine the segments or fragments to request, the client device may also receive a description of the encoded media content data associated with the media content channel. The description may be referred to as a manifest file, template, segment list, or other such term. The description may, for instance, list the available segments or fragments and/or include ordering information for the segments or fragments. The description may contain a template and timing information that facilitates the calculation by the client device of the segments currently available for a live stream.

In particular embodiments, the channel information management module 106 may track, store, transmit, and/or generate the channel description information. Channel description information may be automatically generated as a product of the encoding process. The channel information management module 106 may store channel description information for activated live streaming media content channels. Alternately, or additionally, the channel information management module 106 may be configured to generate channel description information for deactivated live streaming media content channels. For instance, waiting for a newly activated virtual encoder to generate channel description information for a previously deactivated live streaming media content channel may introduce unnecessary delay when the channel is activated. Accordingly, the channel information management module 106 may track segment or fragment information and be generated initial description information quickly when a previously deactivated live streaming media content channel is activated.

The client devices 140-146 may view media content transmitted from the on-demand media system 102 via the network 150. According to various implementations, a client device may be a mobile computer, a laptop computer, a desktop computer, a set top box, a smart television, or any other network-enabled device capable of receiving content for presentation.

According to various embodiments, the network 150 may be any network or combination of networks configured to transmit information. For instance, the network 150 may include a wide area network (WAN), a local area network (LAN), a metropolitan area network (MAN), the Internet, a cellular network, a satellite network, or any other suitable type of network.

Figure 2:
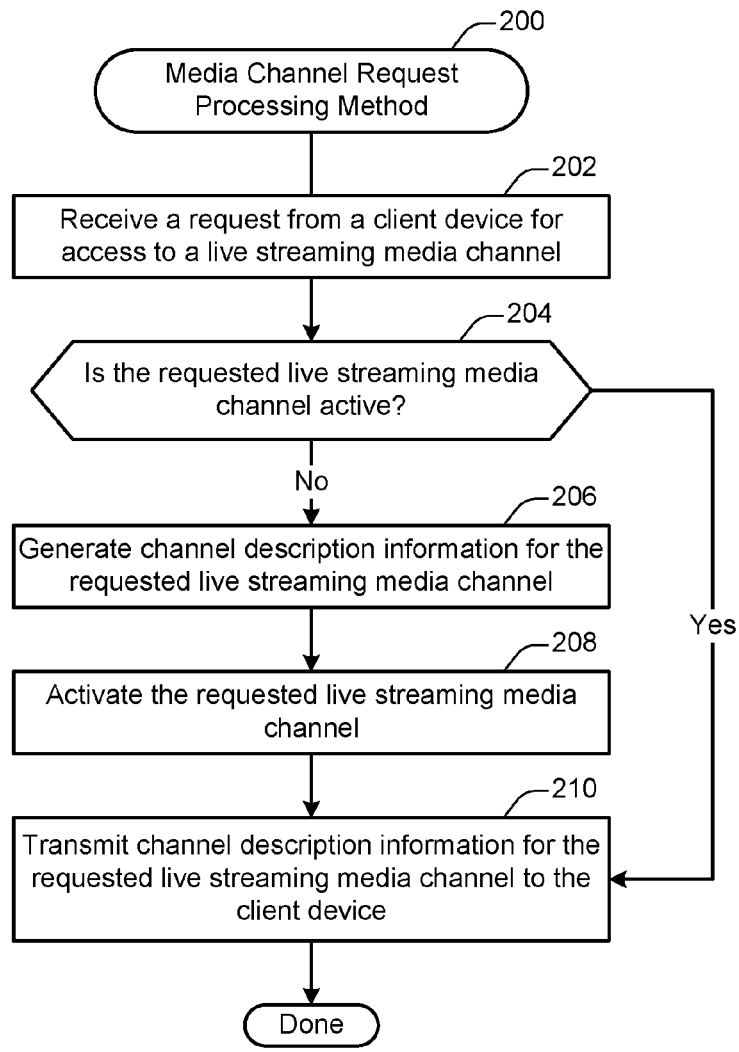
FIG. 2 illustrates an example of a method for processing a request for a media channel, performed in accordance with various techniques and mechanisms of the present invention.

FIG. 2 illustrates an example of a method 200 for processing a request for a media channel, performed in accordance with various techniques and mechanisms of the present invention. The method 200 may be performed at a media system, such as the media system shown in FIG. 1.

At 202, a request is received from a client device for access to a live streaming media channel. According to various embodiments, the request received at 202 may indicate a channel selection event at a client device. For instance, a client device such as a laptop computer, mobile device, or set top box may receive user input that selects the live streaming media channel for presentation at the client device.

In some embodiments, the request from the client device may be received at a web server, such as the web server 104 shown in FIG. 1. As discussed with respect to FIG. 1, the web server 104 may be operable to provide media access and management services for coordinating access by potentially many different client devices to potentially many different media sources and/or media channels.

In some implementations, the channel selection event may be generated or received at the client device. For instance, a user may provide user input at a mobile device indicating a live streaming media channel to access. Alternately, or additionally, the channel selection event may be generated at a different device, such as a remote control in communication with the client device.

In particular embodiments, the request received from the client device may include a request for media channel description information. For example, in the HTTP live streaming context, the request may include a request for a manifest file. As another example, in the DASH context, the request may include a request for an MPD media presentation description file. Correspondingly, for SmoothStreaming, the client may also request a manifest file.

In particular embodiments, the request received from the client device may include a request for DRM or other licensing information to allow the client device to decrypt the live content channel. For instance, the live content channel may be encrypted with any suitable encryption scheme in order to prevent unauthorized access.

At 204, a determination is made as to whether the requested live streaming media channel is activated. According to various embodiments, the determination may be made by consulting information associated with a media system module operable to manage media channel access information for the media system. For instance, the channel information management module 106 shown in FIG. 1 may store an indication of which channels accessible via the on-demand media system 102 are activated at a given time.

At 206, if it is determined that the requested live streaming media channel is not activated, then channel description information is generated for the requested live streaming media channel. According to various embodiments, the channel description information may be generated at least in part by analyzing buffered channel input data stored in the deactivated channel buffer module 108 shown in FIG. 1. For instance, the buffered channel input data may be analyzed to identify Random Access Points such as GoP boundaries for encoded media content data generated by encoding the buffered channel input data. Alternately, or additionally, the buffered channel input data may include encoder-specific parameters that describe the content to be encoded. These parameters may include, but are not limited to: video codec profile and level, width and height, audio codec information, and audio codec parameters such as sampling rate.

In particular embodiments, the channel description information may be generated as part of a procedure for encoding a media channel. However, when a requested channel is deactivated, waiting for the initiation of channel encoding and the subsequent creation of the channel description information to provide the channel description information to a client device may introduce delay into the process of providing the client device with access to the requested channel. Accordingly, when a request is received for a deactivated live streaming media channel, the initial channel description information may be generated apart from the encoding of the live streaming media channel, thus reducing or eliminate the delay associated with providing the channel description information for the requested channel. The information to generate such information in advance may include encoder settings and cached information from an earlier run of the same or similar encoder.

At 208, the requested live streaming media channel is activated. In some implementations, activating the requested live streaming media channel may involve operations such as initiating a virtual encoder for encoding the requested live streaming media channel. Techniques for activating a live streaming media channel are discussed in additional detail with respect to the method 300 shown in FIG. 3.

At 210, channel description information for the requested live streaming media channel is transmitted to the client device. According to various embodiments, the channel description information may be transmitted to the client device via a communications interface operable to transmit information over a network. As discussed with respect to operation 206, the channel description information may indicate to the client device how to access and/or decode the requested live streaming media channel. When a channel is active, channel description information may be generated as part of the encoding process and managed via the channel information management module 106 shown in FIG. 1.

Figure 3:
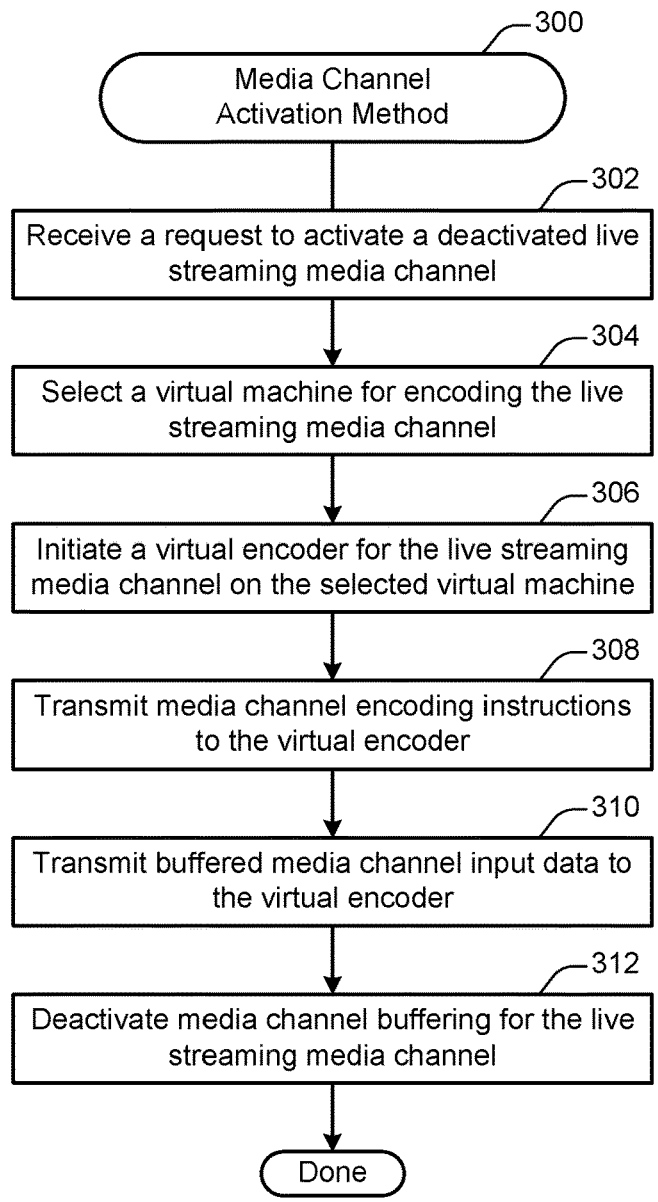
FIG. 3 illustrates an example of a method for activating a media channel.

FIG. 3 illustrates an example of a method 300 for activating a media channel, performed in accordance with one or more embodiments. The method 300 may be performed at a media system, such as the media system shown in FIG. 1. For instance, the method 300 may be performed when a request is received to activate a deactivated live streaming media channel, as discussed with respect to operation 208 shown in FIG. 2.

At 302, a request to activate a deactivated live streaming media channel is received. As discussed with respect to operation 208, such a request may be generated when a client device transmits a request for access to a live streaming media channel for which encoding has been deactivated. In some implementations, the request received at operation 302 may be received at a virtual encoder management module configured to manage virtual encoders for encoding potentially many different media channels. For instance, the request may be received at the virtual encoder management module 110 shown in FIG. 1.

At 304, a virtual machine is selected for encoding the live streaming media channel. According to various embodiments, a single virtual machine may host one or more virtual encoders. The virtual machine may be selected based on operational capacity of the virtual machine, load balancing between virtual machines, computing costs associated with different virtual machines, the type of encoding associated with the encoding of the live streaming media channel, or any other consideration.

In particular embodiments, initiating a virtual machine may involve some amount of computing overhead and delay. Accordingly, one or more virtual machines with at least some amount of unused capacity may be maintained in operation so that a virtual machine already in operation may be selected when initiating a virtual encoder. Alternately, or additionally, selecting a virtual machine may involve initiating a virtual machine not already in operation.

At 306, a virtual encoder is initiated for the live streaming media channel on the selected virtual machine. In some implementations, initiating the virtual encoder may involve transmitting an instruction to the selected virtual machine instructing the virtual machine to create a new instance of a channel encoder.

At 308, media channel encoding instructions are transmitted to the virtual encoder. According to various embodiments, initiating the encoder may involve one or more operations for configuring an encoding procedure for the live streaming media channel. For instance, one or more configuration parameters may be transmitted to the initiated virtual encoder.

In some embodiments, one configuration parameter may indicate a media content source for receiving new live streaming media channel input data for encoding. As discussed with respect to FIG. 1, the media content source may communicate directly or indirectly with the virtual encoder, for instance via the virtual encoder management module.

In some embodiments, one configuration parameter may indicate a bit rate and/or encoding quality for the virtual encoder. The bit rate and/or encoding quality may be associated with an amount of bandwidth needed to transmit the streaming media channel to the client device. For instance, a media channel may be encoded at a lower bit rate for transmission to a mobile device over a mobile network than for transmission to a stationary device via a wired network.

In some embodiments, one configuration parameter may indicate one or more encoding formats for the virtual encoder. An encoding format may indicate, for instance, that the channel is to be encoded for HTTP live streaming, DASH streaming, or any other type of streaming protocol. Other possible parameters may include, but are not limited to: encoder configuration parameters (e.g., picture resolution, frame rate, or track numbers) and/or parameters describing how the generated segment relates to other segments (e.g., segment number, time offsets, and/or segment name).

At 310, buffered media channel input data is transmitted to the virtual encoder. According to various embodiments, buffering and transmitting the buffered media channel input data may facilitate the rapid activation of a deactivated live streaming media channel. Alternately, or additionally, buffering and transmitting the buffered media channel input data may facilitate time shifting, in which a requester may view the live streaming media channel for some time period in the immediate past.

In particular embodiments, transmitting the buffered media channel input data may involve identifying buffered media channel input data associated with the deactivated live streaming media channel and stored in the deactivated channel buffer module 108 shown in FIG. 1. Once identified, this information may be transmitted to a virtual encoder via a network.

In some embodiments, the buffered media channel input data may indicate an interval in the input data. For example, the buffered media channel input data may indicate a range of MPEG-2 TS PTS times to be included in the encoded segment.

At 312, media channel buffering is deactivated for the live streaming media channel. According to various embodiments, deactivating the media channel buffering for the live streaming media channel may involve transmitting an instruction to the deactivated channel buffer module 108 to cease buffering for the live streaming media channel. When a virtual encoder is initiated for the live streaming media channel and when the data previously stored in the channel buffer module 108 for the live streaming media channel is encoded, then buffering new data for the live streaming media channel may no longer be necessary.

Figure 4:
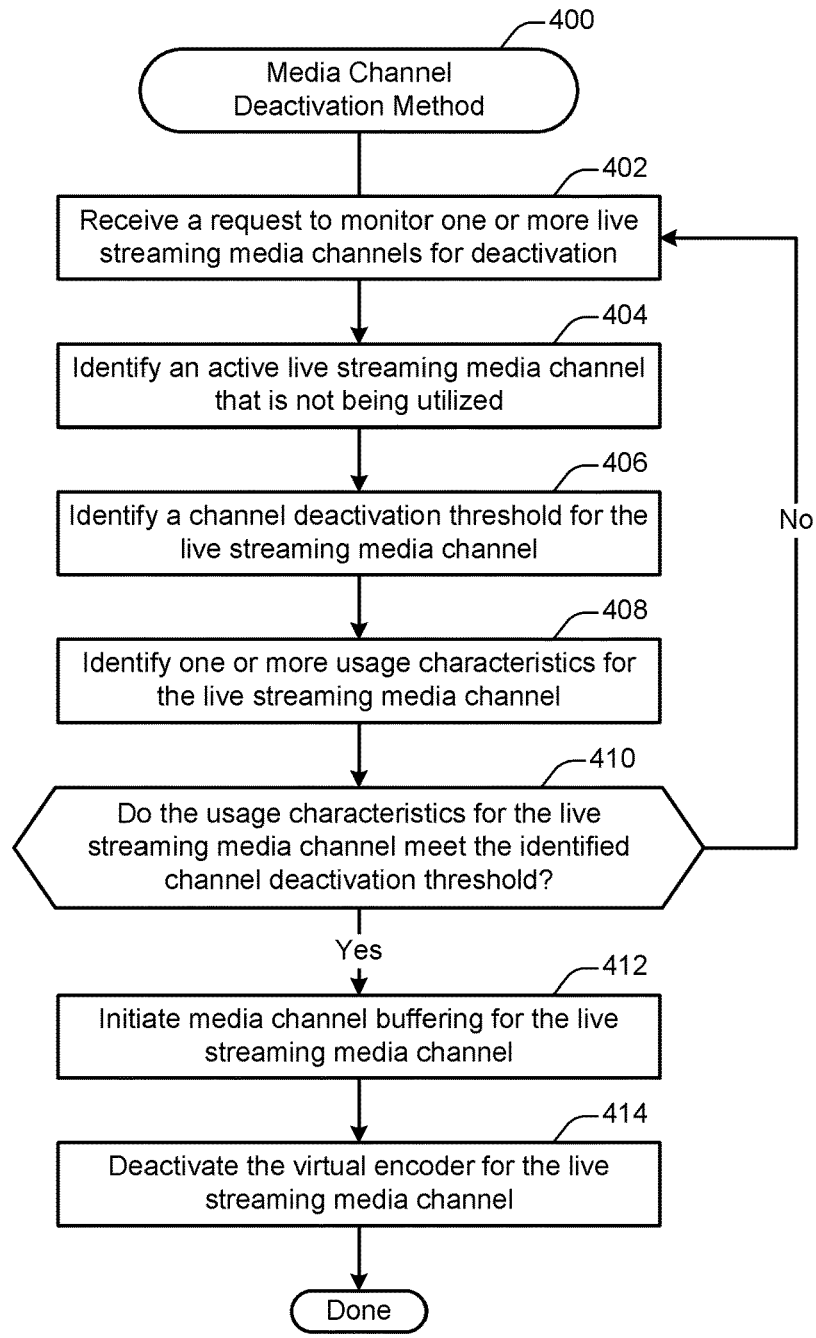
FIG. 4 illustrates an example of a method for deactivating a media channel.

FIG. 4 illustrates an example of a method 400 for deactivating a media channel. The method 400 may be performed at a media system, such as the media system shown in FIG. 1. For instance, the method 400 may be performed when a request is received to monitor one or more live streaming media channels for deactivation.

In particular embodiments, the method 400 may be performed continuously, periodically, or upon request. For example, the media system may monitor an activated live streaming media channel on a continuous or "as needed basis". As another example, the media system may monitor an activated live streaming media channel periodically or at scheduled times, such as every few minutes.

At 402, a request is received to monitor one or more live streaming media channels for deactivation. According to various embodiments, monitoring may be performed for any activated live streaming media channel. As discussed herein, an activated live streaming media channel may be one that is actively being encoded for transmission to one or more client machines. However, a live streaming media channel that is being encoded need not actually be transmitted to a particular client machine for the live streaming media channel to be activated.

At 404, an activated live streaming media channel that is not being utilized is identified. In some implementations, an activated live streaming media channel that is not being utilized may be any live streaming media channel that is being encoded but is not being transmitted to a client device. For instance, a channel may be available for viewing via the media system and may be encoded by the media system for viewing. However, the channel may not actually be requested for viewing.

In particular embodiments, the activated live streaming media channel may be identified by consulting one or more of the web server 104, the channel information management module 106, and the virtual encoder management module 110. For example, the web server 104 may maintain a record of which client devices are viewing which channels. As another example, the channel information management module 106 may maintain a record of the channels for which channel description information has been requested.

At 406, a channel deactivation threshold for the live streaming media channel is identified. According to various embodiments, a channel deactivation threshold may designate one or more characteristics or properties that indicate that an activated live streaming media channel should be deactivated. A single channel deactivation threshold may be common to more than one live streaming media channel or different live streaming media channels may be associated with different channel deactivation thresholds.

In particular embodiments, a channel deactivation threshold may indicate one or more of any of various properties. For example, a channel may be deactivated when it has not been transmitted to a client device for a designated period of time, such as 1 minute, 10 minutes, or 30 minutes. As another example, a channel may be deactivated when it is predicted that the likelihood of the channel being requested for viewing in the near future is relatively low. For instance, the channel may be carrying media content in the future that is similar to content that has had low viewership in the past.

In some implementations, a channel deactivation threshold may be manually configured. For instance, the channel deactivation threshold may be designated by a system administrator. Alternately, or additionally, a channel deactivation threshold may be dynamically determined. For instance, past channel usage characteristics may be analyzed to dynamically determine a likelihood of a channel being requested for viewing in the near future.

At 408, one or more usage characteristics for the live streaming media channel are identified. According to various embodiments, a usage characteristic may be any information that describes how and when the live streaming media channel has been recently viewed or is likely to be viewed. For example, the usage characteristics may identify how many times the channel has been requested for viewing in the recent past. As another example, the usage characteristics may identify past, current, or future media content available for viewing on the media channel. As yet another example, the usage characteristics may identify which users have requested the media channel for viewing in the past. For instance, past viewers of the channel may be compared with activated users of the media system to determine whether the media channel is likely to be requested for viewing in the near future.

At 410, a determination is made as to whether the usage characteristics for the live streaming media channel meet the identified channel deactivation threshold. According to various embodiments, the determination may be made by comparing the usage characteristics identified at operation 408 with the channel deactivation threshold identified at operation 406.

At 412, media channel buffering for the live streaming media channel is initiated. According to various embodiments, initiating media channel buffering may involve transmitting a buffering initiation instruction to the deactivated channel buffer module 108. Buffering may be initiated by performing one or more operations such as allocating buffer space for storing channel data, identifying a media channel source for receiving live streaming media input data for buffering, and designating a time interval for storing buffered input data.

At 414, the virtual encoder for the live streaming media channel is deactivated. According to various embodiments, deactivating the virtual encoder may involve transmitting a deactivation message to an actual or virtual machine at which the virtual encoder is located. When the virtual encoder is deactivated, the encoding of the live streaming media channel is stopped and the live streaming media channel is placed in a deactivated state. Placing the live streaming media channel in a deactivated state may involve, for instance, updating a record of channel status in the channel information module 106 and/or virtual encoder management module 110.

Figure 5:
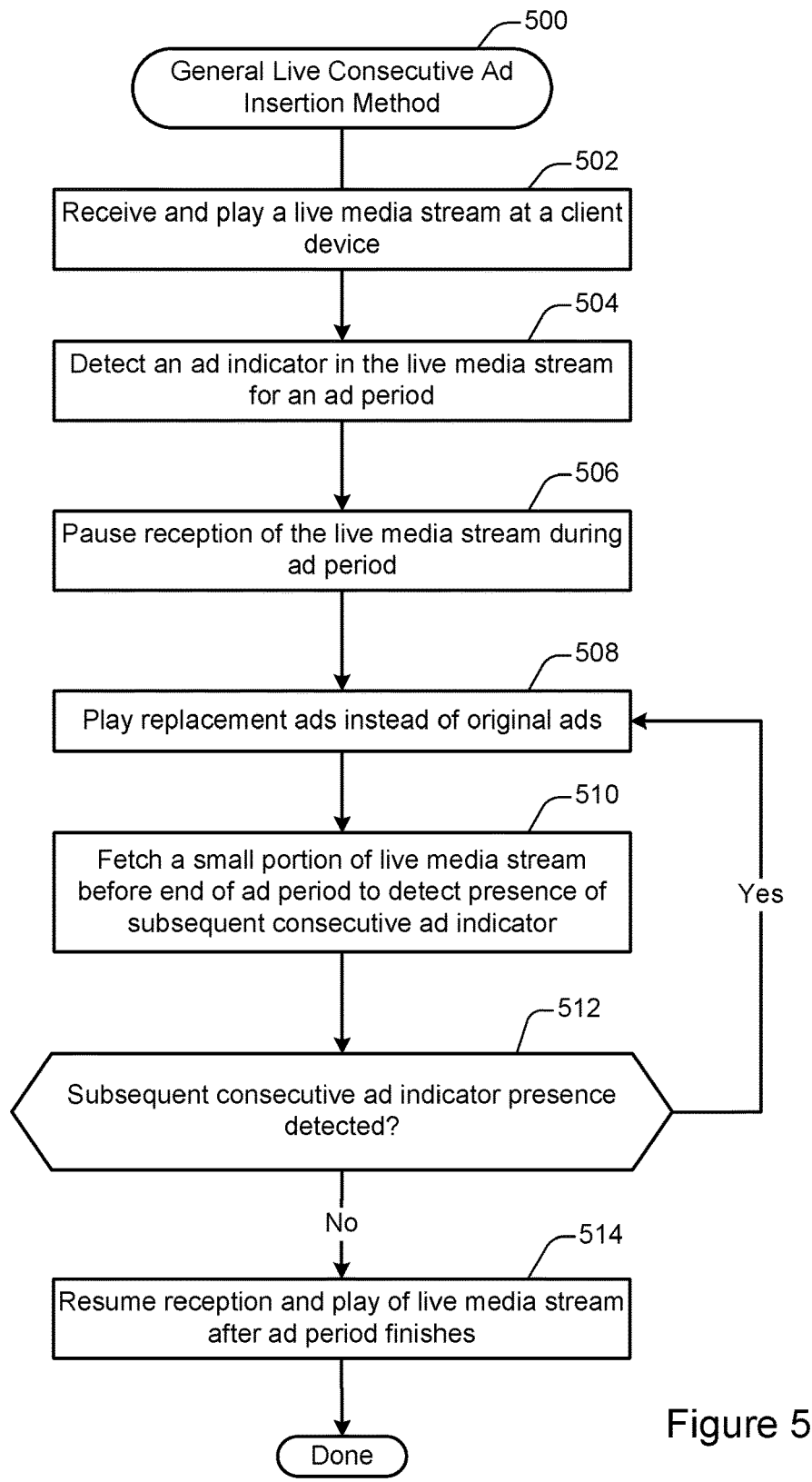
FIG. 5 illustrates an example of a general method for live consecutive ad insertion.

FIG. 5 illustrates an example of a general method 500 for live consecutive ad insertion. At 502, a live media stream is received and played at a client device. At 504, an ad indicator is detected in the live media stream. In some embodiments, the ad indicator indicates an upcoming ad period. In some embodiments, once an ad indicator is detected, an application on the client device contacts an ad network and gets information about what ad (or ad playlist for a series of ads) to play. The app then causes the client device to start downloading (a.k.a "pre-fetch") the ad or series of ads and prepare an ad player, so that the ad or series of ads playback can start at the right instance with minimal or no glitch (leading to a seamless transition). At 506, upon reaching the start point of the ad period in the live media stream, reception of the live media stream is stopped or paused. At 508, the replacement ad, or series of ads, is played instead of an original ad or series of ads in the live media stream.

At 510, sometime during the playback of the replacement ad or ads, a small portion of the live media stream is fetched before the end of the ad period in order to detect the presence of a subsequent consecutive ad indicator. In some embodiments, the small portion is a sample as described earlier in the specification. In some embodiments, the small portion is fetched at a time near the beginning of the ad period. In other embodiments, the small portion is fetched at a time closer to the end of ad period. In various embodiments, the small portion corresponds to segments or only parts of segments in the live stream media with timestamps corresponding to real-time streaming. In other words, even after the system stops receiving and processing the live stream media during the ad period, the sampling of the live stream media corresponds to segments or portions at times corresponding to real-time. For example, if the start point of an original ad in the live media stream is at a time T seconds, then the system stops receiving the live media stream content at time T. Also at time T, a replacement ad, or series of ads, is played instead of an original ad, or series of ads in the live media stream. If the duration of the ad period is 30 seconds and the system samples or fetches a small portion, e.g. 1 kB of data, of the live media stream at T+20 seconds, then the sample fetched is the 1 kB of data in the live media stream corresponding to time T+20 seconds, even though live media stream data from time T to time T+19 seconds were not received nor processed.

At 512, the fetched portion of the live media stream is analyzed to determine the presence of a subsequent consecutive ad indicator, indicating the presence of a consecutive ad period. If a subsequent consecutive ad indicator is detected, then the system repeats steps 508-512 again. If no subsequent consecutive ad indicator is detected, then the system proceeds to step 514. In some embodiments, each replacement ad, or series of ads, must be pre-fetched and prepared before the next ad period begins in order for a seamless transition to occur.

At 514, reception and play of the live media stream is resumed after the ad period finishes. Using the earlier example, the systems starts receiving and processing data from the live media stream at time T+30 seconds (if a subsequent consecutive ad indicator is not detected) because the ad is only 30 seconds long. In some embodiments, as with replacement ads, the live media stream segments are also pre-fetched and prepared for play before the end of the last ad period occurs in order to facilitate a seamless transition back to viewing the live media stream.

Figure 6:
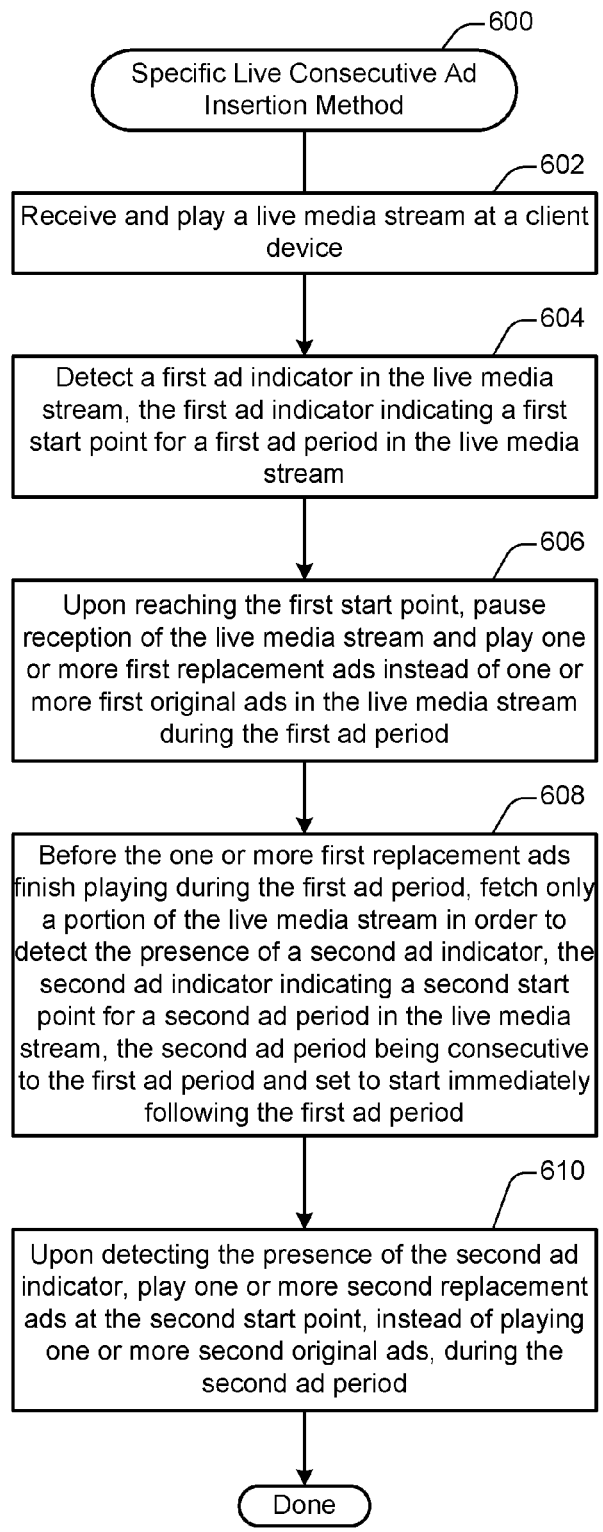
FIG. 6 illustrates an example of a specific method for live consecutive ad insertion.

FIG. 6 illustrates an example of a specific method 600 for live consecutive ad insertion. At 602, a live media stream is received and played at a client device.

At 604, a first ad indicator in the live media stream is detected. In some embodiments, the first ad indicator indicates a first start point for a first ad period in the live media stream. In some embodiments, the first ad indicator also indicates the duration of, or a first stop point for, the first ad period. In some embodiments, the first ad period is long enough for a single ad to be played during the span of the ad period. In other embodiments, the ad period is long enough for several ads to be played within the ad period.

At 606, upon reaching the first start point for the first ad period, the system pauses reception of the live media stream and plays one or more first replacement ads instead of one or more original ads in the live media stream. In some embodiments, the one or more replacement ads are retrieved and prepped for playback before the first start point. In some embodiments, replacement ads are retrieved from a separate ad server. In some embodiments, replacement ads are played on an ad player separate from the player that plays the live media stream content. In other embodiments, replacement ads are inserted seamlessly into the same player that plays the live media stream content. In some embodiments, only a subset of the original ads, not including the entire set, are replaced by replacement ads. For example, if an ad period is scheduled to play 3 original ads, then only the first ad is replaced and the second and third ad is played as originally planned. In such embodiments, the non-replaced original ads are pre-fetched and prepped for play in the same manner as described in step 610 below with regards to resuming live streaming. With such embodiments, ad indicators are detected automatically since the full live media stream is retrieved and played.

At 608, before the first replacement ad finishes playing, the system fetches only a portion of the live media stream, as opposed to receiving the full live media stream, in order to detect the presence of a second ad indicator. In some embodiments, the second ad indicator indicates a second start point for a second ad period in the live media stream. In some embodiments, the second ad indicator also indicates the duration, or a second stop point for, the second ad period. In some embodiments, the second ad period is determined to be consecutive to the first ad period and set to play immediately following the first ad period. As with the first ad period, the second ad period can be long enough for just a single ad or a series of ads.

At 610, upon detecting the presence of the second ad indicator, the system plays one or more second replacement ads at the second start point instead of playing one or more second original ads, during the second ad period. As with the first ad period, in some embodiments, only some of the original ads are replaced. In such cases, the non-replaced original ads are played from the live media stream in the live media player.

In some embodiments, fetching the portion of the live media stream occurs 5-10 seconds before the first stop point for the first ad period in the live media stream. In some embodiments, fetching the portion of the live media stream occurs 1-20 seconds before the first stop point for the first ad period in the live media stream. In some embodiments, the system resumes reception and play of the live media stream after the second ad period terminates, or after the first ad finishes if no second ad indicator is detected (or if a the second ad indicator indicates the presence of a subsequent ad period that is not consecutive to the first ad period). In some embodiments, the size of the fetched portion of the live media stream is within the range of 50 bytes to 10 kilobytes, inclusive.

In some embodiments, for each ad period, the system fetches a portion of the live media stream before the ad period comes to an end in order to determine the presence of another consecutive ad indicator. In such embodiments, if another consecutive ad indicator is detected, then another replacement ad, or series of replacement ads, is played consecutively and the cycle repeats again starting from fetching a portion of the live media stream towards the end of the ad period.

In some embodiments, the client device uses a separate application that coordinates both playing the live media stream and playing replacement ads between a live media player, an ad player, a live media source, and an ad source.

Figure 7:
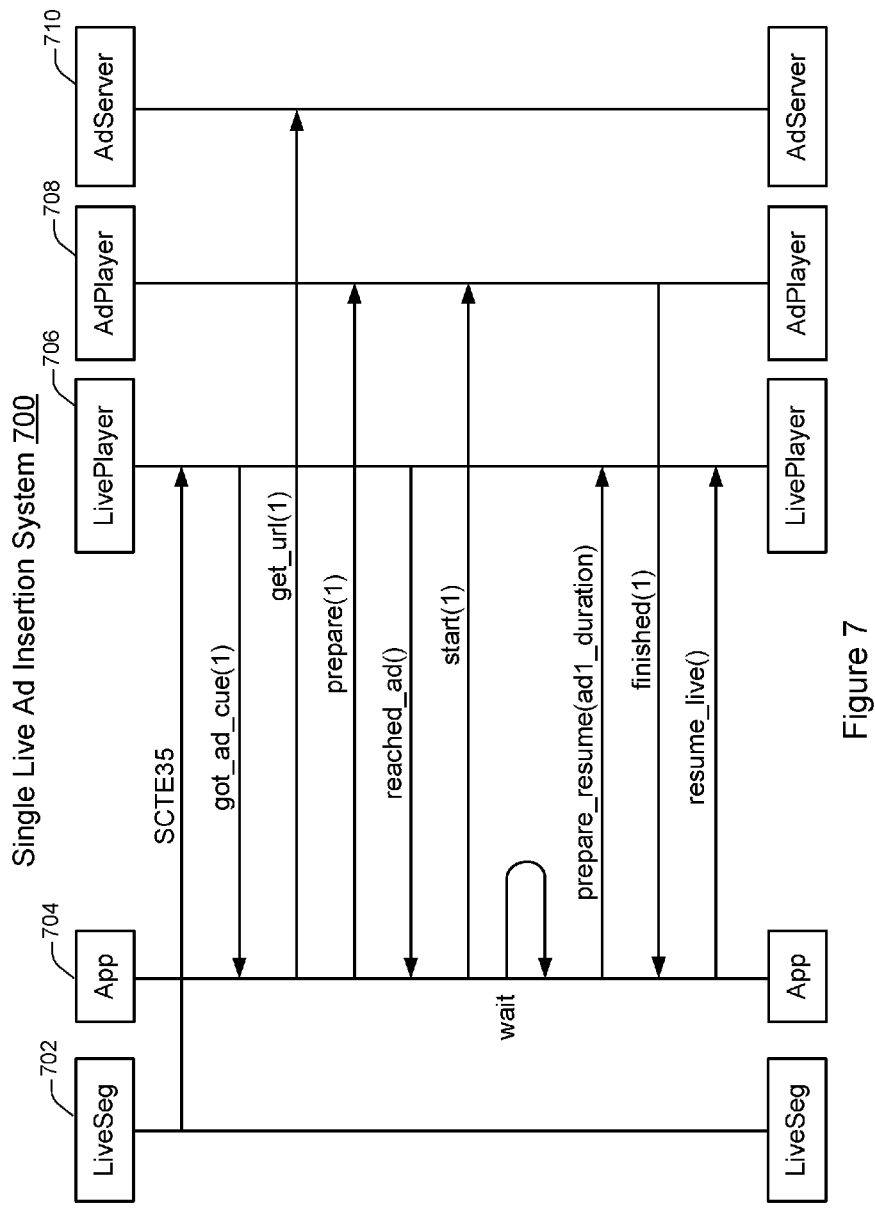
FIG. 7 is a block diagram depicting an example of a single live ad insertion system.

FIG. 7 is a sequence diagram depicting an example of a single live ad insertion system 700. Live media stream 702 first sends an ad indicator, or SCTE35 emsg, to live player 706. Live player 706 informs application 704, via function call got_ad_cue(1), that an ad in live media stream 702 is coming up. Application 704 then retrieves a replacement ad, via_get_url(1), from ad server 710 and signals ad player 708 to prepare to play the replacement ad, via prepare(1). Live player 706 then informs application 704 that the starting point for the ad has been reached, via reached_ad( ). Application 704 then signals ad player 708 to start playing the ad, via start(1). Application 704 then waits while the ad plays on ad player 708. Before the ad finishes playing, application 704 signals to live player 706 to prepare to resume playing of live media stream 702, via prepare_resume(adl_duration). Once ad player 708 informs application 704 that it has finished playing the ad, via finished(1), application 704 tells live player 706 to resume playing live media stream 702, via resume_live( ).

Figure 8:
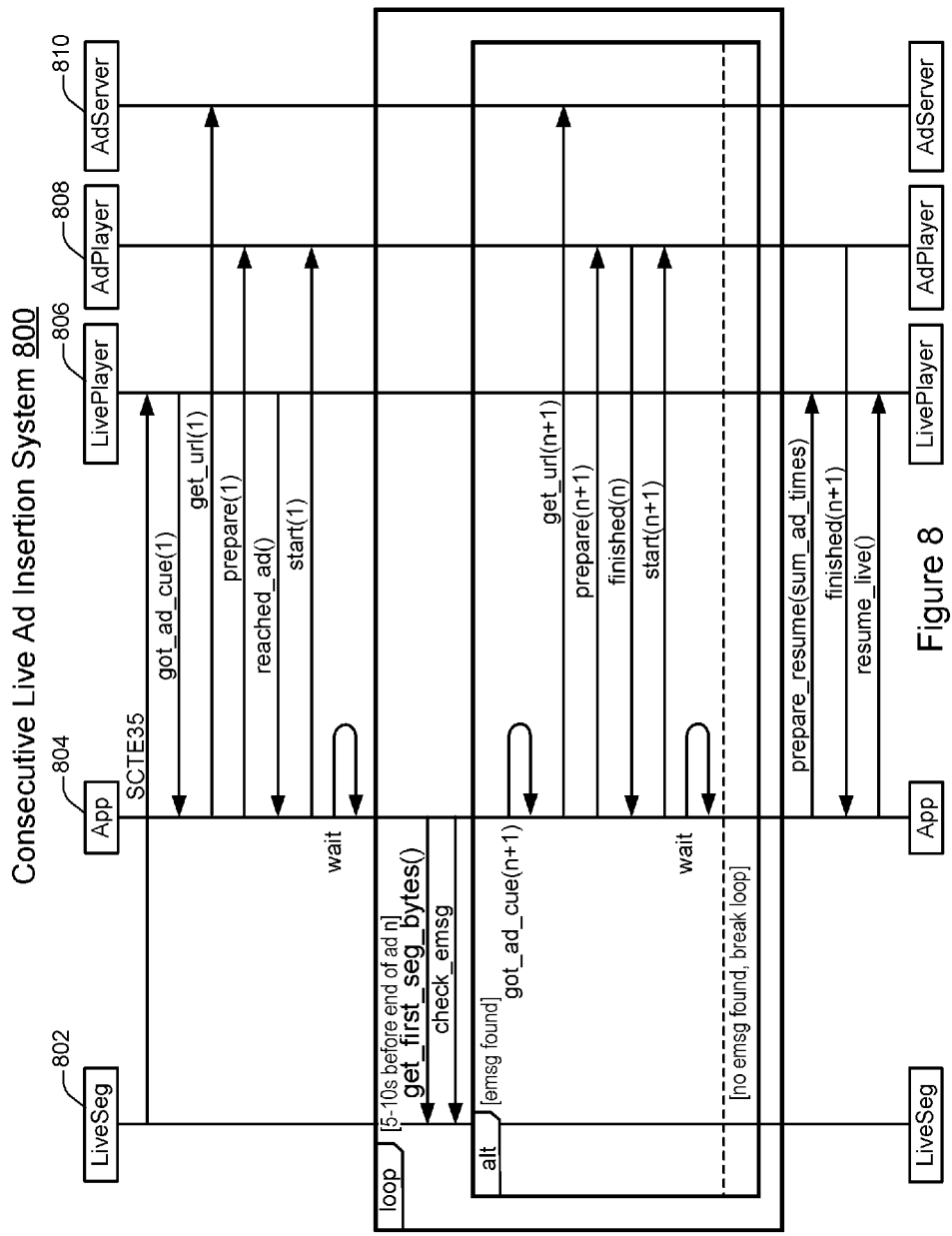
FIG. 8 is a block diagram depicting an example of a consecutive live ad insertion system.

FIG. 8 is a block diagram depicting an example of a consecutive live ad insertion system 800. As with single live ad insertion system 700, live media stream 802 first sends an ad indicator, or SCTE35 emsg, to live player 806. Live player 806 informs application 804, via function call got_ad_cue(1), that a first ad in live media stream 802 is coming up. Application 804 then retrieves a first replacement ad, via get_url(1), from ad server 810 and signals ad player 808 to prepare to play the first replacement ad, via prepare(1). Live player 806 then informs application 804 that the starting point for the first ad has been reached, via reached_ad( ). Application 804 then signals ad player 808 to start playing the ad, via start(1). Application 804 then waits while the first ad plays on ad player 808. About 5-10 seconds before the first ad finishes playing, application 804 retrieves a small sample of live media stream 802 via get_first_seg_bytes( ). Then application 804 checks to see if a subsequent ad indicator has been detected, via check_emsg. If an emsg is found, application 804 determines that a subsequent ad is coming right after the first ad, via got_ad_cue(n+1). Application 804 then retrieves a second replacement ad from ad server 810, via get_url(n+1), and signals ad player 808 to prepare to play the second replacement ad, via prepare(n+1). Ad player 808 then informs application 804 that the first replacement ad has finished playing, via finished(n). Application 804 then signals ad player 808 to start playing the second replacement ad, via start(n+1). Application 804 then waits while the second ad plays on ad player 808. It should be noted that system 800 loops through get_first_seg_bytes( ) to the wait just after start(n+1) as long as an emsg is found during check_emsg. If no emsg is found, then the loop breaks and application 804, after waiting for the last replacement ad to finish playing, signals to live player 806 to prepare to resume playing of live media stream 802 at a time equal to when the first replacement ad started playing plus the sum of all subsequent replacement ads, via prepare_resume(sum_ad_times). Once ad player 808 informs application 804 that it has finished playing the final replacement ad, via finished (n+1), application 804 tells live player 806 to resume playing live media stream 802, via resume_live( ).

In various embodiments, an ad period may contain one or more ads fetched and played using various means like concatenated into one continuous ad or specified as items in a playlist of ads.

Figure 9:
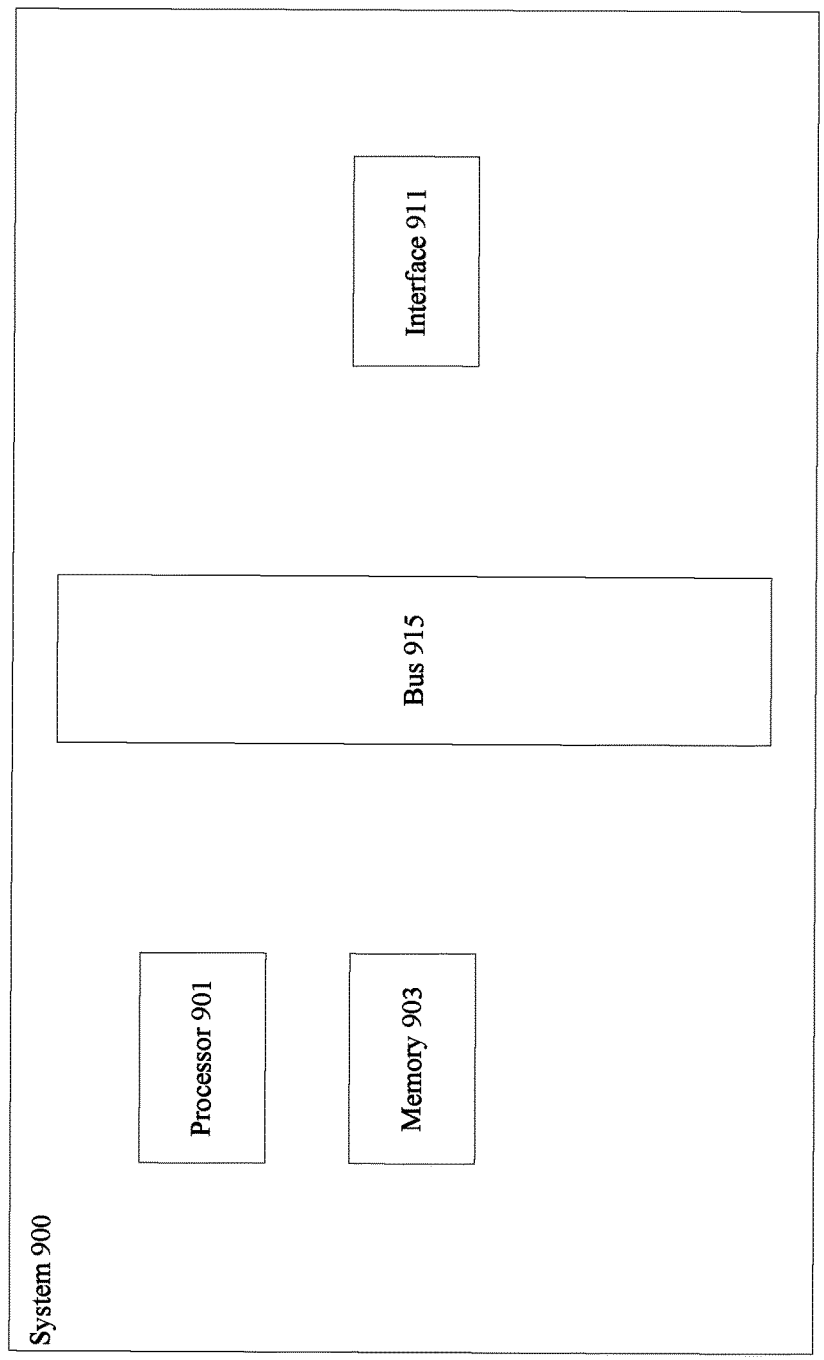
FIG. 9 illustrates an example of a system.

FIG. 9 illustrates one example of a computing device. According to particular embodiments, a system 900 suitable for implementing particular embodiments of the present invention includes a processor 901, a memory 903, an interface 911, and a bus 915 (e.g., a PCI bus or other interconnection fabric) and operates as a streaming server. When acting under the control of appropriate software or firmware, the processor 901 is responsible for modifying and transmitting live media data to a client. Alternately, or additionally, the system 900 may be configured as a client device operable to receive and present media content items. Various specially configured devices can also be used in place of a processor 901 or in addition to processor 901. The interface 911 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
   receiving and playing a live media stream at a client device;
   playing a first ad during a first ad period in the live media stream;
   before the first ad finishes playing during the first ad period, fetching only a portion of the live media stream in order to detect the presence of a subsequent ad indicator, the subsequent ad indicator indicating a start point for a second ad period in the live media stream for playing an original second ad, the second ad period being consecutive to the first ad period and set to start immediately following the first ad period;
   detecting the subsequent ad indicator;
   fetching a replacement ad to play in place of the original second ad; and
   playing the replacement ad at the start point for the second ad period, instead of playing the original second ad in the live media stream, during the second ad period.

2. The method recited in claim 1, wherein the replacement ad is received from an ad server.

3. The method recited in claim 1, wherein the subsequent ad indicator also indicates a stop point for the second ad period in the live media stream.

4. The method recited in claim 1, wherein fetching the portion of the live media stream occurs 1-20 seconds before a first stop point for the first ad period in the live media stream.

5. The method recited in claim 1, wherein the replacement ad is fetched and prepared for playing after receiving the subsequent ad indicator but before the start point for the second ad period.

6. The method recited in claim 1, further comprising resuming reception and play of the live media stream after the replacement ad finishes playing.

7. The method recited in claim 1, wherein the size of the fetched portion of the live media stream is within the range of 50 bytes to 10 kilobytes, inclusive.

8. The method recited in claim 1, further comprising, for each ad period:
fetching a portion of the live media stream before the ad period expires to determine the presence of a subsequent consecutive ad indicator for a subsequent consecutive ad period in the live media stream; and
upon detecting the presence of a subsequent consecutive ad indicator, playing one or more subsequent consecutive replacement ads during the subsequent consecutive ad period in place of one or more subsequent consecutive original ads in the live media stream.

9. The method recited in claim 1, wherein the live media stream includes both encrypted and unencrypted data and the fetched portion of the live media stream consists of unencrypted data.

10. The method recited in claim 1, wherein the live media stream contains one or more current ad indicators that occur within the first ad period, the one or more current ad indicators indicating that segments in the live media stream are currently within the first ad period.

11. A system comprising:
a communications interface configured to communicate with media and ad servers over a network; and
a processor configured to:
receive and play a live media stream at a client device;
play a first ad during a first ad period in the live media stream;
before the first ad finishes playing during the first ad period, fetch only a portion of the live media stream in order to detect the presence of a subsequent ad indicator, the subsequent ad indicator indicating a start point for a second ad period in the live media stream for playing an original second ad, the second ad period being consecutive to the first ad period and set to start immediately following the first ad period;
detect the subsequent ad indicator;
fetch a replacement ad to play in place of the original second ad; and
play the replacement ad at the start point for the second ad period, instead of playing the original second ad in the live media stream, during the second ad period.

12. The system recited in claim 11, wherein the replacement ad is received from an ad server.

13. The system recited in claim 11, wherein the subsequent ad indicator also indicates a stop point for the second ad period in the live media stream.

14. The system recited in claim 11, wherein fetching the portion of the live media stream occurs 1-20 seconds before a first stop point for the first ad period in the live media stream.

15. The system recited in claim 11, wherein the replacement ad is fetched and prepared for playing after receiving the subsequent ad indicator but before the start point for the second ad period.

16. The system recited in claim 11, wherein the live media stream includes both encrypted and unencrypted data and the fetched portion of the live media stream consists of unencrypted data.

17. The system recited in claim 11, wherein the size of the fetched portion of the live media stream is within the range of 50 bytes to 10 kilobytes, inclusive.

18. The system recited in claim 11, wherein the processor is further configured to, for each ad period:
fetch a portion of the live media stream before the ad period expires to determine the presence of a subsequent consecutive ad indicator for a subsequent consecutive ad period in the live media stream; and
upon detecting the presence of a subsequent consecutive ad indicator, play one or more subsequent consecutive replacement ads during the subsequent consecutive ad period in place of one or more subsequent consecutive original ads in the live media stream.

19. The system recited in claim 11, wherein the live media stream contains one or more current ad indicators that occur within the first ad period, the one or more current ad indicators indicating that segments in the live media stream are currently within the first ad period.

20. A non-transitory computer readable medium having instructions stored thereon for performing a method, the method comprising:
receiving and playing a live media stream at a client device;
playing a first ad during a first ad period in the live media stream;
before the first ad finishes playing during the first ad period, fetching only a portion of the live media stream in order to detect the presence of a subsequent ad indicator, the subsequent ad indicator indicating a start point for a second ad period in the live media stream for playing an original second ad, the second ad period being consecutive to the first ad period and set to start immediately following the first ad period;
detecting the subsequent ad indicator;
fetching a replacement ad to play in place of the original second ad; and
playing the replacement ad at the start point for the second ad period, instead of playing the original second ad in the live media stream, during the second ad period.

* * * * *